(12) United States Patent
Han et al.

(10) Patent No.: US 7,876,848 B2
(45) Date of Patent: Jan. 25, 2011

(54) APPARATUS AND METHOD FOR TRANSMITTING A DATA STREAM IN A WIRELESS COMMUNICATION SYSTEM WITH MULTIPLE ANTENNAS

(75) Inventors: Jin-Kyu Han, Suwon-si (KR); Dae-Gyun Kim, Seongnam-si (KR); Hwan-Joon Kwon, Suwon-si (KR); Dong-Hee Kim, Yongin-si (KR); Youn-Sun Kim, Seongnam-si (KR); Han-Kyu Park, Seoul (KR); Cheol Mun, Suwon-si (KR); Myoung-Won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1251 days.

(21) Appl. No.: 11/190,003

(22) Filed: Jul. 27, 2005

(65) Prior Publication Data

US 2006/0023624 A1 Feb. 2, 2006

(30) Foreign Application Priority Data

Jul. 27, 2004 (KR) ...................... 10-2004-0058745

(51) Int. Cl.
*H04B 7/02* (2006.01)
(52) U.S. Cl. ...................... 375/267; 375/299
(58) Field of Classification Search .................. 375/260, 375/267, 299
See application file for complete search history.

(56) References Cited

U.S. PATENT DOCUMENTS

| | | | |
|---|---|---|---|
| 7,317,770 B2 * | 1/2008 | Wang | 375/340 |
| 2002/0181634 A1 * | 12/2002 | Yang et al. | 375/354 |
| 2003/0125040 A1 * | 7/2003 | Walton et al. | 455/454 |
| 2003/0161282 A1 * | 8/2003 | Medvedev et al. | 370/329 |
| 2004/0027994 A1 * | 2/2004 | Baines | 370/252 |
| 2004/0141566 A1 * | 7/2004 | Kim et al. | 375/267 |
| 2004/0162021 A1 * | 8/2004 | Seki et al. | 455/39 |
| 2005/0220211 A1 * | 10/2005 | Shim et al. | 375/267 |

* cited by examiner

*Primary Examiner*—David B Lugo
(74) *Attorney, Agent, or Firm*—Roylance, Abrams, Berdo & Goodman, L.L.P.

(57) ABSTRACT

An apparatus and method for determining a transmission unit for data stream transmission in a wireless communication system in which multiple transmission and reception antennas are used and a receiver provides information on a data stream to be transmitted through a transmission unit. A fading estimator calculates fading values from the multiple transmission antennas to the multiple reception antennas. A channel quality estimator reverse-orders combined weights for multiple transmission units based on the fading values from the multiple transmission antennas to the multiple reception antennas, successively selects transmission units for data stream transmission among the reverse-ordered transmission units, determines a modulation and coding scheme (MCS) for each of the selected transmission units, and feeds back the MCS to a transmitter.

32 Claims, 7 Drawing Sheets

APPARATUS AND METHOD FOR TRANSMITTING A DATA STREAM IN A WIRELESS COMMUNICATION SYSTEM WITH MULTIPLE ANTENNAS

PRIORITY

This application claims the benefit under 35 U.S.C. §119 (a) of an application entitled "Apparatus and Method for Transmitting Data Stream in a Wireless Communication System with Multiple Antennas" filed in the Korean Intellectual Property Office on Jul. 27, 2004 and assigned Serial No. 2004-58745, the entire contents of which are hereby incorporated by reference.

BACKGROUND OF THE INVENTION

1. Field of the Invention

The present invention relates generally to an apparatus and mobile communication system for transmitting data streams in a wireless communication system, and in particular, to an apparatus and method for transmitting data streams in a wireless communication system with multiple antennas.

2. Description of the Related Art

In general, a mobile communication system is one of the typical wireless communication systems. The mobile communication system has been originally developed to support voice communication. Recently, however, there is an increasing demand for high-speed data communication as well as the voice transmission. To meet the demand, many attempts to efficiently transmit data streams are being made in the mobile communication system. As a result, the mobile communication system is evolving into a high-speed, high-quality wireless packet data communication system to provide a data service and a multimedia service as well as the existing voice service. The standardization efforts for High Speed Downlink Packet Access (HSDPA) led by $3^{rd}$ Generation Partnership Project (3GPP) and 1×Evolution Data and Voice (EV-DV) led by $3^{rd}$ Generation Partnership Project 2 (3GPP2) are being made to find a solution for providing a high-speed, high-quality wireless packet data service at 2 Mbps or higher in the $3^{rd}$ generation (3G) mobile communication system. The future $4^{th}$ generation (4G) mobile communication system aims at providing a high-speed, high-quality multimedia service at a rate higher than 2 Mbps.

As one of the attempts to transmit packet data at high speed, a multi-antenna technique has been proposed. The multi-antenna technique can be roughly classified into two techniques: a beamforming technique (also known as a smart antenna technique) and an antenna diversity technique. The former detects a position of a mobile station and forms a beam in the detected direction in the process of transmitting transmission signals through antenna beams. The latter obtains diversity gain by providing array antennas to a transmitter and a receiver.

When the array antennas are used, the transmission efficiency mainly depends on the number of transmission data streams and modulation schemes therefor. Therefore, the next generation wireless communication system, in which the array antennas are used, requires an apparatus and method for effectively determining the number of data streams that can be transmitted through each antenna, and a modulation scheme used for transmission of the data streams through the corresponding antenna.

SUMMARY OF THE INVENTION

It is, therefore, an object of the present invention to provide an apparatus and method for optimally determining the number of transmission data streams, a modulation scheme, and a coding rate to maximize transmission data capacity in a Multiple-Input and Multiple-Output (MIMO) wireless communication system.

It is another object of the present invention to provide an apparatus and method for allocating power weights to transmission data streams to maximize transmission data capacity in a MIMO wireless communication system.

It is further another object of the present invention to provide an apparatus and method for increasing transmission data capacity in a MIMO wireless communication system in which a successive symbol estimation and interference cancellation algorithm is used.

It is still another object of the present invention to provide an apparatus and method for reducing calculations in a MIMO wireless communication system in which a successive symbol estimation and interference cancellation algorithm is used.

According to one aspect of the present invention, there is provided a method for determining a transmission unit for data stream transmission in a wireless communication system in which multiple transmission and reception antennas are used and a receiver provides information on a data stream to be transmitted through a transmission unit. The method comprises the steps of: reverse-ordering combined weights for multiple transmission units based on fading values from the multiple transmission antennas to the multiple reception antennas; successively selecting transmission units for data stream transmission among the reverse-ordered transmission units; and determining a modulation and coding scheme (MCS) for each of the selected transmission units and feeding back the MCS to a transmitter.

According to another aspect of the present invention, there is provided an apparatus for determining a transmission unit for data stream transmission in a wireless communication system in which multiple transmission and reception antennas are used and a receiver provides information on a data stream to be transmitted through a transmission unit. The apparatus comprises a fading estimator for calculating fading values from the multiple transmission antennas to the multiple reception antennas, and a channel quality estimator for reverse-ordering combined weights for multiple transmission units based on the fading values from the multiple transmission antennas to the multiple reception antennas, successively selecting transmission units for data stream transmission among the reverse-ordered transmission units, determining a modulation and coding scheme (MCS) for each of the selected transmission units, and feeding back the MCS to a transmitter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

A description will now be made of a multi-antenna system in which a transmitter and a receiver use array antennas to obtain diversity gain.

To provide a high-speed, high-quality data service in a wireless communication system, a Multiple-Input and Multiple-Output (MIMO) system has been proposed in which multiple antennas are used for both a transmitter and a receiver. Theoretically, it is known that in the MIMO system, the capacity of serviceable data increases with the number of transmission and reception antennas without an additional increase in frequency bandwidth.

The MIMO technique provides high capacity in proportion to the number of transmission and reception antennas when fading between the transmission and reception antennas is independent. However, the capacity considerably decreases in an environment where the fading has a high spatial correlation rather than in the environment where the fading is independent. This is because if the fading between the transmission and reception antennas increases in spatial correlation, signals transmitted from the transmission antennas experience similar fading, making the receiver have difficulty in distinguishing the signals. In this case, the signals transmitted from the transmission antennas increase interference to each other, increasing symbol estimation error, and the increase in the symbol estimation error reduces the transmission data capacity. In an actual mobile communication environment, a space between the transmission and reception antennas must be greater than or equal to 4 wavelengths to obtain an independent fading characteristic between the transmission and reception antennas. However, a small-sized mobile station's receiver or a base station system with many transmission antennas cannot satisfy the requirement. As a result, the actual transmission capacity decreases due to the spatial correlation characteristic of the fading.

The MIMO system simultaneously transmits multiple data streams via multiple transmission antennas. If the multiple data streams are simultaneously transmitted in this manner, the receiver requires a technique for distinguishing the multiple transmission data streams before restoration. As a typical technique for distinguishing the multiple transmission data streams, a Vertical Bell Laboratories Layered Space-Time (V-BLAST) technique has been proposed. In the V-BLAST reception technique, the receiver successively estimates symbols of each data stream. A detailed description thereof will be given below.

The transmission antennas transmit their own independent data streams. Therefore, all of the reception antennas of the receiver receive a sum of the data streams transmitted from the transmission antennas. That is, a data stream received at one reception antenna is a mixture of all of the data streams transmitted from the multiple transmission antennas. When the mixed data streams are received in this manner, the receiver estimates one of the data streams, and removes the estimated symbols from the mixed data streams received at the reception antennas, thereby canceling interference caused by the previously estimated symbol during the next symbol estimation.

The successive symbol estimation and interference cancellation processes are repeatedly performed until all of the data streams are restored. In this technique, when estimation of a first symbol is failed, an error occurs in the interference cancellation process for the next symbol, causing an estimation error for the next symbol. This is called an "error propagation phenomenon." The capacity reduction caused by the error propagation phenomenon becomes more serious in a fading channel environment having a high spatial correlation.

According to the recent research, it is known that in a fading environment having a high spatial correlation or an environment having a low received signal-to-interference plus noise ratio (SINR), transmitting a single data stream using beamforming is equal to simultaneously transmitting multiple data streams in the MIMO system in terms of the transmission capacity. However, when the incomplete interference cancellation or the error propagation phenomenon between the multiple data streams occurring in actual application is taken into consideration, the technique of transmitting a single data stream by beamforming provides the higher transmission capacity. Therefore, when transmitting multiple data streams, the technique of simultaneously transmitting the multiple data streams using the MIMO technique can provide the higher transmission capacity in an environment having a low spatial correlation or a high SINR. On the contrary, in an environment having a high spatial correlation or a low SINR, the technique of transmitting a single data stream by beamforming provides the higher transmission capacity.

The MIMO technique is roughly classified into three techniques: Per-Antenna Rate Control (PARC), Per-Stream Rate Control (PSRC), and Per-Common Basis Rate Control (PCBRC). The PARC technique simultaneously transmits multiple data streams via multiple transmission antennas, and distinguishes the signals received at multiple reception antennas of a receiver on a per-transmission antenna basis, thereby providing a high peak data rate. A PARC transmitter demultiplexes a main data stream to be transmitted into as many sub-data streams as the number of transmittable sub-data streams using quality information of each sub-data stream or Modulation and Coding Scheme (MCS) information, fed back from the receiver. The PARC transmitter independently channel-codes and modulates each of the sub-data streams. The symbols processed in this manner are transmitted to the receiver via each antenna.

As described above, the respective transmission antennas transmit data streams at different data rates, because they have different transmission channels. Therefore, the respective data streams may also use different coding rates and modulation schemes. The number of transmittable sub-data streams, and the coding rate and modulation scheme for each sub-data stream are determined according to per-antenna channel quality information or MCS information, fed back from the receiver. The recent PARC research proposes a technique in which when there are two transmission antennas, the two transmission antennas simultaneously transmit two data streams, or only one of the two transmission antennas transmits one data stream. More specifically, the PARC calculates a data rate for each of the case (i) where only the first one of the two transmission antennas transmits a data stream, the case (ii) where only the second one of the two transmission antennas transmits a data stream, and the case (iii) where the two transmission antennas simultaneously transmit data streams, and selects the case having the highest data rate. When the two transmission antennas simultaneously transmit data streams, transmission power of each transmission antenna become ½ of the transmission power of a transmission antenna for the case where the data stream is transmitted via a single transmission antenna.

The PSRC technique is equal to the PARC technique in terms of controlling data rates per sub-data stream, but different from the PARC technique in that a transmitter transmits each sub-data stream by beamforming according to a weight selected at a receiver. The PSRC transmitter demultiplexes a main data stream to be transmitted into as many sub-data streams as the number of transmittable sub-data streams based on quality information of each sub-data stream or MCS information, fed back from the receiver. The transmitter independently encodes and modulates each of the demultiplexed sub-data streams, and multiplies the modulated sub-data stream by a weight fed back from the receiver, thereby transmitting the sub-data stream by beamforming. Similarly, the PSRC technique calculates a data rate for each of the case (i) where data is transmitted with only a first weight, the case (ii) where data is transmitted with only a second weight, and the case (iii) where data is transmitted with both the first weight and the second weight, and selects the case having the highest data rate.

Finally, the PCBRC technique is equal to the PSRC technique in terms of transmitting each sub-data stream by beamforming, but different from the PSRC technique in that a transmitter multiplies each sub-data stream by a fixed beamforming weight before transmission. The PCBRC transmitter demultiplexes a main data stream to be transmitted into as many sub-data streams as the number of transmittable sub-data streams based on quality information of each sub-data stream or MCS information, fed back from the receiver. The transmitter independently encodes and modulates each of the demultiplexed sub-data streams, and multiplies symbols of each of the modulated sub-data streams by a fixed weight, thereby transmitting the sub-data stream by fixed beamforming.

Signals transmitted by the PARC/PSRC/PCBRC transmitter experience fading channels. That is, multiple reception antennas of the receiver receive the fading channel signals. A description will now be made of a receiver using a Minimum Mean Squared Error (MMSE) V-BLAST technique which is the typical serial detection (SD) algorithm.

A receiver can be divided into a fading estimator, a channel quality estimator, and a data symbol demodulator according to function. The fading estimator estimates a fading H from each transmission antenna (for PARC) or transmission weight (for PSRC and PCBRC) to each reception antenna using pilot channels or pilot symbols received from the multiple reception antennas. The data symbol demodulator demodulates data symbols using the estimated fading H, and multiplexes the demodulated sub-data streams into one main data stream. The channel quality estimator estimates the channel quality from each transmission antenna (for PARC) or transmission weight (for PSRC and PCBRC) to each reception antenna of the receiver using the estimated fading H. The receiver determines an MCS available for each transmission antenna (for PARC) or transmission weight (for PSRC and PCBRC), and feeds back the MCS information to the transmitter.

The fading H estimated by the fading estimator is used for two purposes. A first purpose of the estimated fading H will be described below. The estimated H is used for demodulating received data streams in a symbol demodulation and decoding block of a mobile station. A data demodulation and decoding process performed in the symbol demodulation and decoding block of the mobile station will now be described below. If the number of transmission sub-data streams is defined as K, the symbol demodulation and decoding block of the receiver calculates MMSE weight vectors for K transmitted sub-data streams using an estimated fading matrix H. Further, the symbol demodulation and decoding block calculates SINRs for the K sub-data streams according to their associated MMSE weight vectors. Thereafter, the symbol demodulation and decoding block first estimates symbols of a sub-data stream having the highest SINR among the calculated SINRs for the K sub-data streams, and decodes the estimated symbols, thereby restoring a first sub-data stream.

Next, to restore a second sub-data stream, the symbol demodulation and decoding block encodes again the restored first sub-data stream, and performs symbol mapping on the encoded sub-data stream according to a corresponding modulation scheme. Thereafter, the symbol demodulation and decoding block multiplies the symbol-mapped values based on the modulation scheme by the weight vectors of the channel. In this manner, it is possible to reproduce a signal through which the first sub-data stream was received. A reception signal of the second sub-data stream to which the first sub-data stream does not serve as interference, can be obtained by subtracting the reproduced signal through which the first sub-data stream was received, from the reception signal. That is, the symbol demodulation and decoding block cancels interference caused by the previously estimated data during the next data estimation, by removing a part by the first sub-data stream estimated through the foregoing process.

The symbol demodulation and decoding block calculates SINRs for the sub-data streams according to MMSE weight vectors and weights for the remaining (K−1) sub-data streams. The symbol demodulation and decoding block estimates symbols of a sub-data stream having the highest SINR among the calculated SINRs for the sub-data streams, and cancels interference to the estimated symbols. The successive symbol estimation and interference cancellation processes are repeatedly performed until all of the K sub-data streams are restored. Through the foregoing demodulation process, data of the K sub-data streams is restored. This process becomes the first purpose of the estimated H.

Next, a second purpose of the estimated H will be described below. The H estimated by the fading estimator of the receiver is used for estimating the channel quality from each transmission antenna (for PARC) or transmission weight (for PSRC and PCBRC) to a reception antenna of the receiver in the channel quality estimator. The channel quality estimator estimates the channel quality from each transmitter (antenna or transmission weight) to the receiver using the same MMSE V-BLAST reception algorithm as that used in the demodulator. The channel quality estimation process performed in the channel quality estimator is equal to the traffic data demodulation process performed in the demodulator, but different in terms of demodulating pilot symbols transmitted from $n_T$ transmitters and calculating SINRs for the corresponding symbols instead of performing data demodulation in the demodulator. Through the channel quality estimation process by MMSE V-BLAST, SINRs for the pilot symbols transmitted from the $n_T$ transmitters are calculated. That is, the channel qualities from the $n_T$ transmitters to the receiver are estimated, and MCSs available in the $n_T$ transmitters according thereto are determined.

The estimated channel quality information or MCS information is transmitted to the transmitters through an uplink feedback channel. The feedback information is used in the transmitters for determining the number of transmittable sub-data streams, power allocated for each sub-data stream, and a coding rate and a modulation scheme for each sub-data stream.

To maximize the transmission data capacity in the MIMO technique, it is necessary to control the number of simultaneously transmittable sub-data streams, a data rate for each sub-data stream, and power allocated to each sub-data stream. To this end, the MIMO technique selects transmission units actually available for transmission among all of the possible transmission units, and allocates transmission power to transmission units included in a set of the selected transmission units. In addition, there is a need for a technique of transmitting data streams using the selected transmission units. The PARC (or PSRC) technique proposes a scheme of, when there are two transmission antennas, calculating a data rate for each of the case (i) where a first transmission antenna (or weight) is used for transmission, the case (ii) where a second transmission antenna (or weight) is used for transmission, and the case (iii) where both the first and second transmission antennas (or weights) are used for transmission, and selecting the case having the highest data rate. However, a V-BLAST-based SD reception algorithm using the successive symbol estimation and interference cancellation, should take demodulation order into consideration because the data rate depends on even the demodulation order. That is, when data streams are transmitted with both of the first and second transmission antennas (or weights), the demodulation order should be considered for the following two cases. In a first case, a data stream for the first transmission antenna (or weight) is first demodulated, and next, a data stream for the second transmission antenna (or weight) is demodulated. In a second case, a data stream for the second transmission antenna (or weight) is first demodulated, and next, a data stream for the first transmission antenna (or weight) is demodulated. Therefore, when the demodulation order is taken into account, the total number of cases for selecting transmission antennas (or weights) is four.

In conclusion, the V-BLAST-based SD reception algorithm using the successive symbol estimation and interference cancellation does not take into account the data demodulation order that greatly affects the highest data rate. Therefore, when the V-BLAST method is used, the possible highest data rate cannot be provided. In addition, because this technique has been proposed only for the case where there are two transmitters, it cannot be applied to the MIMO system having two or more transmitters.

That is, in the method described above, the number of transmission data streams for which the demodulation order is considered, a modulation scheme and coding rate for each transmission data stream, and transmission power for each transmission data stream should be determined in the transmitters. Therefore, an increase in number of the transmission antennas exponentially increases the number of cases that must be considered. As a result, a method for selecting the case of providing the maximum transmission capacity by taking all of the possible cases into account is difficult to implement because of the excessive calculations. Therefore, there is a need for a technique of determining the number of transmission data streams, a modulation scheme and coding rate for each transmission data stream, and transmission power for each transmission data stream so as to provide transmission data capacity approximating the maximum transmission capacity, while minimizing the calculations.

Herein, the present invention proposes an apparatus and method for maximizing the transmission data capacity in MIMO technology. The proposed apparatus and method selects transmission units having the high channel quality among all of the possible transmission units, and allocates transmission power only to the selected transmission units. The transmission power allocated to each of the selected transmission units is determined by dividing the total transmission power by the number of the selected transmission units. In other words, the apparatus and method concentrates the transmission power only to the transmission units having the high channel quality according to application environment, contributing to an increase in efficiency of the transmission power and an increase in the transmission data capacity. Particularly, in an environment where fading channels between transmitters and receivers have a high spatial correlation, or in an environment having a low SINR, the novel apparatus and method provides the optimal transmission data capacity by concentratively allocating transmission power to a less number of transmission units.

There are two possible methods for adaptively selecting transmission units having the high channel quality from among all of the possible transmission units according to the application environment. A brief description of the two methods will be given herein below.

A first method applies a V-BLAST-based SD reception algorithm to all of the possible transmission units taking the demodulation order into account for all of the possible selection combinations, and then selects a combination providing the highest data rate. The V-BLAST-based SD reception algorithm, unlike the conventional reception algorithm, takes the demodulation order into account, thereby enabling the full-capacity transmission available in the corresponding fading environment. However, if the number of transmission antennas exceeds 2, the number of all the possible cases for which the demodulation order is considered increases by geometric progression, increasing required calculations.

A second method determines demodulation order in which demodulation is performed on the transmission units in the order of a transmission unit with the lower channel quality by reverse ordering, and successively determines MCSs for transmission data streams from the transmission units in the demodulation order. This method can provide transmission capacity approximating the optimal transmission capacity with less required calculations even though the number of the transmission antennas increases.

Herein, the present invention will be described with reference to the PARC technique by way of example. The PARC, PSRC and PCBRC techniques are different from each other in terms of the transmission unit that controls a data rate of transmission data streams and transmits the transmission data streams. The PARC technique controls a data rate per antenna for transmission, the PSRC technique controls a data rate per selected weight for transmission, and the PCBRC technique controls a data rate per fixed weight for transmission. In the following description, therefore, the term "transmission units" refers to antennas for the case where the present invention is applied to PARC, transmission weights selected by a receiver for the case where the present invention is applied to PSRC, and fixed weights for the case where the present invention is applied to PCBRC.

Before a description of the present invention is given, hypotheses for implementation of the present invention will be provided, by way of example. The specific values given herein are subject to change.

Hypotheses

A description will now be made of hypotheses for MCSs representing combinations of modulation schemes and coding rates of channel encoder. Although there are various possible combinations of modulation schemes and coding rates according to mobile communication system, the combinations of modulation schemes and coding rates shown in Table 1 will be used herein by way of example.

TABLE 1

| MCS | Coding Rate | Modulation Scheme |
|-----|-------------|-------------------|
| 0   |             | No Transmission   |
| 1   | ½           | QPSK              |
| 2   |             | 8PSK              |
| 3   |             | 16QAM             |
| 4   |             | 64QAM             |
| 5   | ¾           | QPSK              |
| 6   |             | 8PSK              |
| 7   |             | 16QAM             |
| 8   |             | 64QAM             |

For MCS=0, a corresponding transmission unit transmits no data because the channel quality of the corresponding transmission unit is so poor that transmission is impossible even with the combination of the highest coding rate and the modulation scheme with the least number of bits per symbol.

Embodiment

Figure 1:
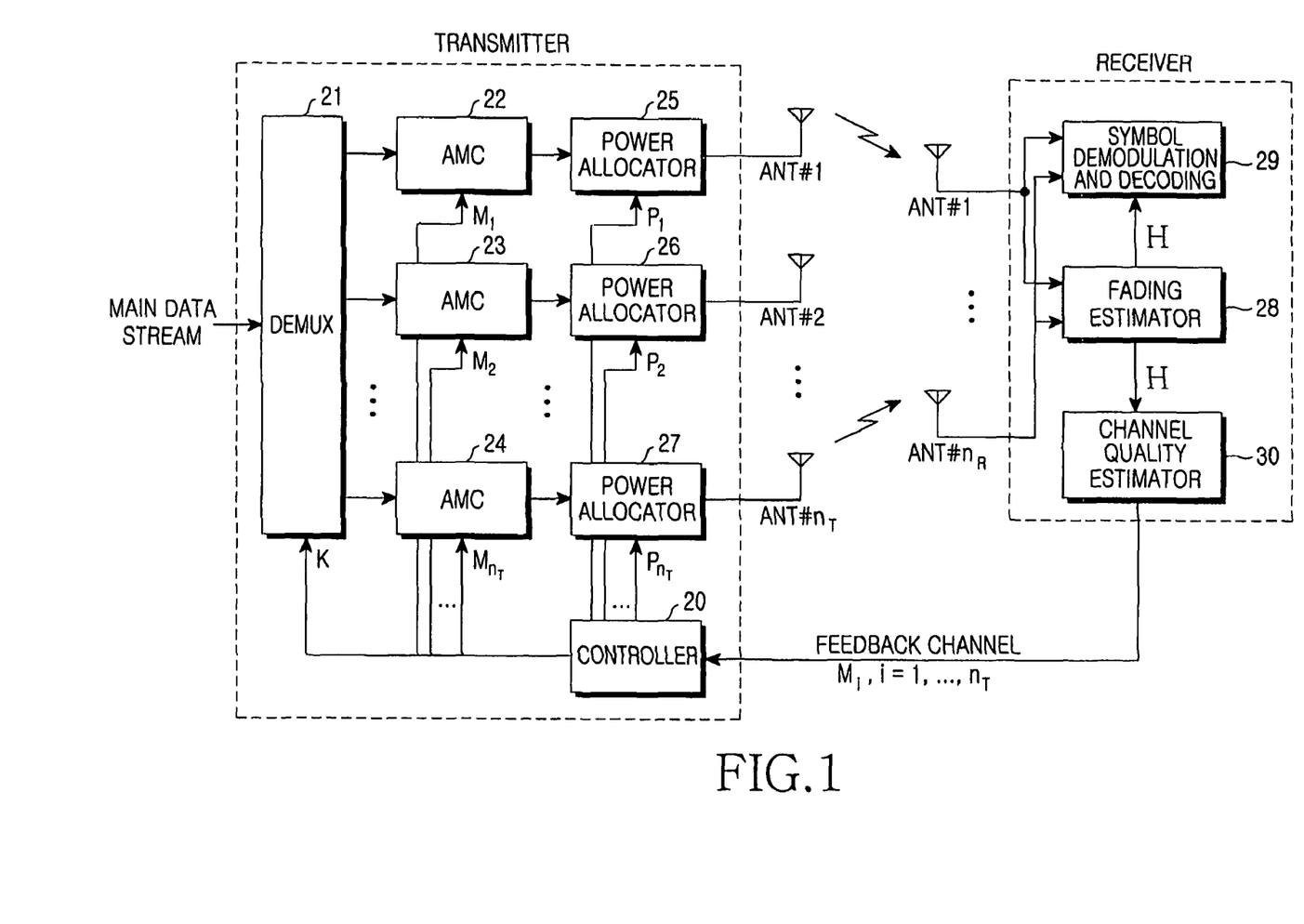
FIG. 1 is a block diagram illustrating a PARC system to which the present invention is applied.

FIG. 1 is a block diagram illustrating a PARC system to which the present invention is applied. With reference to FIG. 1, a description will now be made of a structure and operation of a PARC system according to an embodiment of the present invention.

A controller 20 of a transmitter receives an MCS $M_i$ (i=1, ..., $n_T$) representing a combination of a modulation scheme and a coding rate available in each transmission unit, determined according to the channel quality from the corresponding transmission unit to a receiver, from a channel quality estimator 30 of the receiver through a feedback channel. If the algorithm proposed in the present invention is implemented in the receiver, the feedback information becomes the MCS, and if the proposed algorithm is implemented in the transmitter, the receiver feeds back a channel quality indicator (CQI) based on which the transmitter performs the algorithm. It will be assumed herein that the proposed algorithm is implemented in the receiver. Therefore, $M_i$ represents an MCS allocated to each antenna channel. However, the present invention is available even when the proposed algorithm is implemented in the transmitter. In this case, the feedback information from the channel quality estimator 30 becomes the CQI.

The controller 20 determines a transmission unit #i with $M_i \neq 0$ as a transmission unit selected for transmission, and determines the number of the transmission units with $M_i \neq 0$ as the number K of transmittable sub-data streams. That is, the controller 20 determines a value obtained by subtracting the number of transmission units that cannot transmit data due to their low channel qualities from the total number $n_T$ of transmission units, as the number K of transmittable sub-data streams. The controller 20 provides the determined number K of transmittable sub-data streams and the MCS used for the streams to a demultiplexer 21. The demultiplexer 21 demultiplexes an input main data stream into K sub-data streams. That is, the demultiplexer 21 segments the input main data stream into as many sub-data streams as the number of transmittable sub-data streams, determined by the controller 20. The segmented sub-data streams are input to their associated adaptive modulation and coding (AMC) blocks 22, 23 and 24. The AMC blocks 22, 23 and 24 determine modulation schemes and coding rates corresponding to the MCS feedback information $M_i$ for their associated transmission units, provided from the controller 20, in accordance with Table 1. As described above, Table 1 is given by way of example. Therefore, the mapping rule between the modulation schemes and the coding schemes is subject to change. Herein, the mapping rule of Table 1 is used by way of example. The AMC blocks 22, 23 and 24 receive the MCS information shown in Table 1 from the controller 20 and perform coding and modulation on the sub-data streams.

The AMC blocks 22, 23 and 24 provide the coded and modulated sub-data streams to their associated power allocators 25, 26 and 27. The power allocators 25, 26 and 27 allocate power to the sub-data streams according to power allocation values provided from the controller 20, and transmit the power-allocated sub-data streams through their associated transmission units. Because it is assumed herein that the present invention is applied to the PARC technique, the transmission units refer to their corresponding antennas.

As a rule, the present invention uniformly allocates power to the selected units. That is, if the total transmission power is defined as $P_T$ and the number of units selected for transmission is given as K (K≦$n_T$), the selected units are uniformly allocated the power of $P_T/K$. This is because an additional increase in the transmission data capacity, acquired by separately controlling power allocated to the transmission units, is insignificant, as the AMC blocks 22, 23 and 24 independently control rates of the data transmitted through their associated transmission units according to transmission channel qualities of the transmission units. In addition, if the power allocated to the transmission units are separately controlled, the receiver should feed back, to the transmitter, not only the MCS information for the transmission units but also additional information on power to be allocated to the transmission units, increasing the amount of the feedback information. The increase in the amount of the feedback information causes a delay of the feedback information due to the limited feedback channel capacity and increases an influence of a feedback information error, which instead reduces the transmission data capacity. Therefore, the controller 20 uniforms the power allocated to the power allocators 25, 26 and 27.

The receiver is divided into a fading estimator 28, a symbol demodulation and decoding block 29, and a channel quality estimator 30 according to function. The fading estimator 28 estimates a fading H from each transmission unit to each reception antenna using pilot channels or pilot symbols received at a plurality of reception antennas. According to the MIMO technology, PARC estimates a fading channel from each transmission antenna to each reception antenna, and PSRC and PCBRC, using transmission weights, each estimate a fading channel from each transmission weight to each reception antenna. The estimated fading channel is denoted by H. The H is an $n_R \times n_T$ matrix expressed as $$H=[h_1 h_2 \ldots h_{n_T}] \quad (1)$$

where $h_n$ is an $n_R \times 1$ vector and represents a fading channel from an $n^{th}$ transmission unit to $n_R$ reception antennas.

The symbol demodulation and decoding block 29 restores data symbols using the estimated H. The channel quality estimator 30 estimates transmission channel quality of each transmission unit using the H. The channel quality estimator 30 determines an MCS available in each transmission unit using the estimated channel quality information of each transmission unit, and feeds back the MCS information to the transmitter. If the MCS is determined in the transmitter, the channel quality estimator 30 simply feeds back information on the estimated channel quality of each transmission unit to the transmitter.

The system proposed in the present invention adaptively selects transmission units having the high transmission channel quality among all of the possible transmission units according to an environment applied to the system, and determines MCSs available for the selected transmission units. When implemented in the transmitter, this algorithm is performed in the controller 20 of the transmitter, and when implemented in the receiver, this algorithm is performed in the channel quality estimator 30. For the algorithm, the present invention proposes the following two methods.

First Method

The first method applies a V-BLAST reception algorithm to all of the possible cases taking demodulation order into account, and selects the case having the highest data rate.

Figure 2:
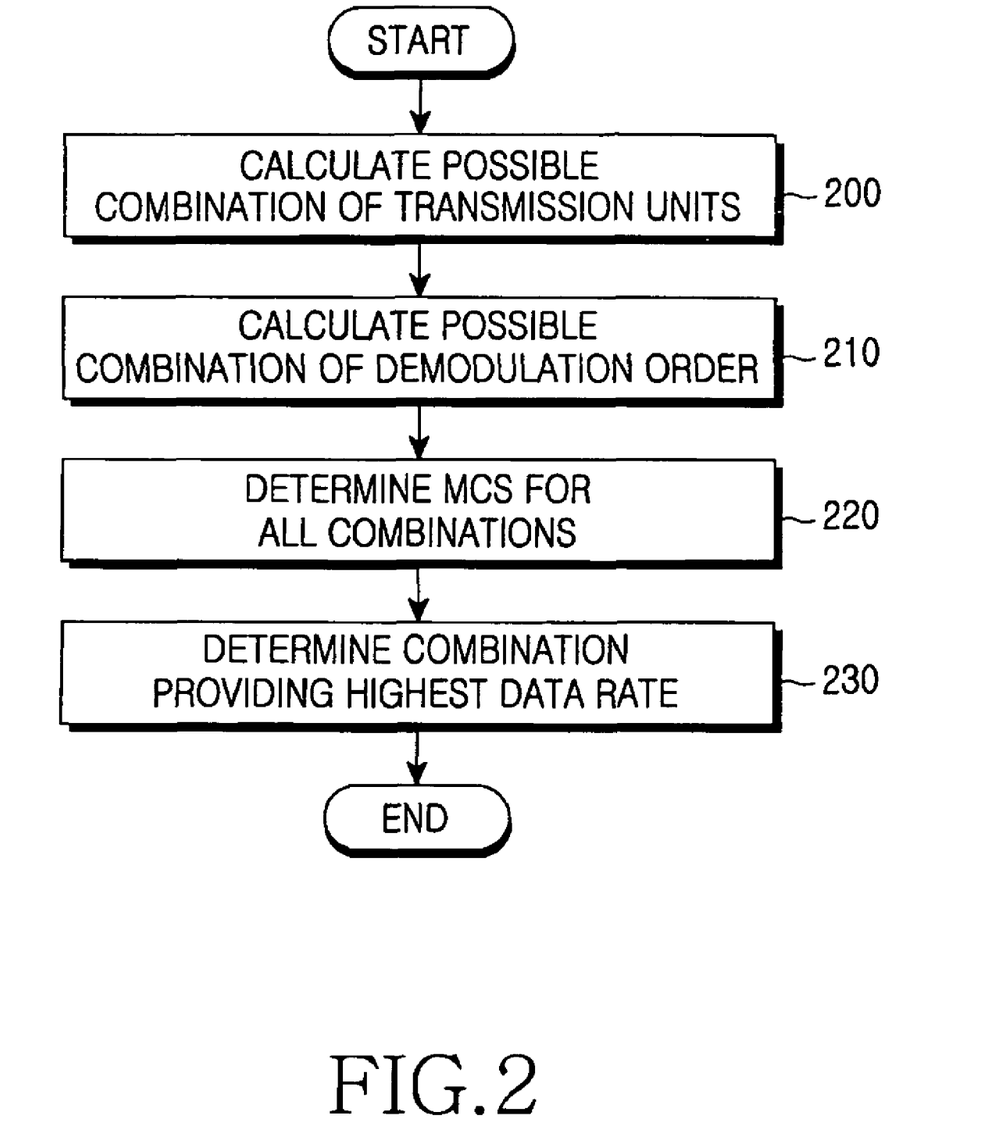
FIG. 2 is a flowchart illustrating a method for determining an active transmission unit and an MCS according to an embodiment of the present invention.

FIG. 2 is a flowchart illustrating a method for determining an active transmission unit and an MCS according to an embodiment of the present invention. With reference to FIG. 2, a detailed description will now be made of a control process of determining an active transmission unit and an MCS according to an embodiment of the present invention. FIG. 2 is a flowchart for the first method. As described above, the control of FIG. 2 can be achieved in either the transmitter or the receiver. It will be assumed herein that all of the possible combinations are determined in the receiver.

In step 200, the channel quality estimator 30 calculates (defines) all of possible combinations of transmission units. The number of the possible transmission unit combinations is $2^{n_T}-1$, including a combination in which one of the $n_T$ transmission units is selected through a combination in which all of the $n_T$ transmission units are selected. The transmission unit combinations in which one of the $n_T$ transmission units is selected means that one sub-data stream is transmitted, and the transmission unit combinations in which a plurality of transmission units are selected means that a plurality of sub-data streams are transmitted. For the case where several sub-data streams are transmitted, the transmission unit combinations are defined according to demodulation order for the transmission units. For example, when n transmission units are selected, the number of possible combinations defined according to the demodulation order is $n!(=1 \times 2 \times, \ldots, \times n)$.

After calculating the transmission unit combinations, the channel quality estimator 30 calculates possible combinations of demodulation orders for each of the transmission unit combinations in step 210. Through steps 200 and 210, the channel quality estimator 30 selects different transmission units and defines all of the possible combinations having different demodulation orders. Thereafter, in step 220, the channel quality estimator 30 determines MCSs for all of the combinations. In step 230, the channel quality estimator 30 selects a combination providing the highest data rate based on the determined MCSs. That is, through step 230, the channel quality estimator 30 determines transmission units and demodulation orders therefor.

The conventional technology does not include step 210. However, the V-BLAST reception algorithm using successive symbol estimation and interference cancellation must take the demodulation order into account because the data rate depends on even the demodulation order. For better understanding of the present invention, the invention will be described on the assumption that the number of transmission units is 2.

When there are two the transmission units, the conventional method calculates a data rate for all of the case (i) where a first transmission unit is used for transmission, the case (ii) where a second transmission unit is used for transmission, and the case (iii) where both of the first and second transmission units are used for transmission, and selects the case having the highest data rate. When both of the two transmission units transmit data streams, transmission power of each transmission unit become ½ of the transmission power of a transmission unit for the case where the data stream is transmitted via a single transmission unit.

However, the V-BLAST reception algorithm using successive symbol estimation and interference cancellation must take the demodulation order into account because the data rate depends on even the demodulation order. That is, for the case where both of the first and second transmission units are used for transmission, the V-BLAST reception algorithm must consider both of the case where a first transmission unit signal is first demodulated and next, a second transmission unit signal is demodulated, and the case where the second transmission unit signal is first demodulated and next, the first transmission unit signal is demodulated. Therefore, when the demodulation order is taken into account, the total number of cases for selecting transmission units is four.

In this case, the channel quality estimator 30 determines an SINR and an MCS for each of the 4 cases of $(i_1,i_2)=(1,0)$, $(2,0)$, $(1,2)$, and $(2,1)$ using the estimated fading H. Herein, $i_k$ denotes an index of a transmission unit, a signal from which is demodulated in the $k^{th}$ order. In the cases of $(1,0)$ and $(2,0)$, a sub-data stream is transmitted through only one of the first transmission unit and the second transmission unit. Therefore, the channel quality estimator 30 calculates an SINR for each case, and determines an MCS according to the SINR. The possible transmission data capacity is determined depending on the determined MCS.

In the case of $(1,2)$ and $(2,1)$, the two transmission units transmit sub-data streams. The channel quality estimator 30 calculates an SINR for each case in which the MMSE V-BLAST reception algorithm is applied to the transmission units in the demodulation order, and then determines an MCS according to the SINR. The total possible transmission data capacity is calculated as a sum of transmission data capacities determined depending on the MCSs of the two transmission units. The channel quality estimator 30 selects the case having the maximum capacity by comparing the possible transmission data capacities calculated for the 4 cases, and feeds back information on MCSs of the transmission units for the selected case, to the transmitter.

The V-BLAST reception algorithm, unlike the conventional reception algorithm, takes the demodulation order into account, thereby enabling the full-capacity transmission available in the corresponding fading environment. However, if the number of transmission units exceeds 2, the number of all the possible cases for which the demodulation order is considered increases by geometric progression. When the number $n_T$ of transmission units is greater than 2, the number of cases that should be taken into consideration is $$\sum_{k=1}^{n_T} \frac{n_T!}{(n_T-K)!}.$$

When there are 4 transmission units, the transmitter must apply the MMSE V-BLAST reception algorithm to 64 cases, and calculate a possible data rate for each case. Therefore, an increase in number of the transmission units exponentially increases the calculations.

Second Method

The proposed first method is disadvantageous in that the increase in number of the transmission units considerably increases the required calculations. Therefore, the present invention proposes a straightforward method for providing transmission capacity approximating the optimal transmission capacity with less required calculations. Herein, a V-BLAST reception algorithm using MMSE reception weights will be described below, by way of example. The second method can also be applied to a zero forcing (ZF) algorithm or an SD reception algorithm using reception weights.

Before a description of the second method is given, reverse ordering will be described.

The reverse ordering is one of the methods for determining demodulation order for transmission units when the successive interference cancellation-based SD algorithm is performed in the receiver. The reverse ordering performs demodulation on the transmission units in the order of a transmission unit with the lower channel quality, i.e., with the lower SINR. While the conventional BLAST receiver performs demodulation on the transmission units in the order of a transmission unit with the higher channel quality, the novel receiver performs demodulation on the transmission units in the order of a transmission unit with the lower channel quality. A description will now be made of the reverse ordering method.

The reverse ordering method calculates combined weight vectors for $n_T$ transmission units using an estimated fading matrix H, and calculates the channel qualities, i.e., SINRs, for the channels from the $n_T$ transmission units according to the combined weight vectors. The reverse ordering method determines a transmission unit with the lowest SINR among the calculated $n_T$ SINRs as a transmission unit to be first demodulated. The reverse ordering method removes a part given by a pilot channel transmitted from the transmission unit determined to be first demodulated from all of the received pilot channel signals. Thereafter, in the next step, the method calculates combined weights for the other $(n_T-1)$ transmission units and calculates SINRs. In this manner, for the $(n_T-1)$ transmission units, the reverse ordering method determines a transmission unit with the lowest SINR among the SINRs as a transmission unit to be calculated secondly. Subsequently, the method cancels interference caused by the pilot channel from the corresponding transmission unit.

The foregoing estimation and interference cancellation processes are successively performed on $n_T$ transmission units. Through this process, the demodulation order is determined for the $n_T$ transmission units. For a pilot channel from a transmission unit demodulated in the last $n_T^{th}$ step, an SINR is calculated after all of the interferences are canceled through the serial detection and interference cancellation processes performed in the previous $(n_T-1)$ steps. Therefore, the transmission unit demodulated later has the higher SINR, transmitting data at higher data rate.

Figure 3:
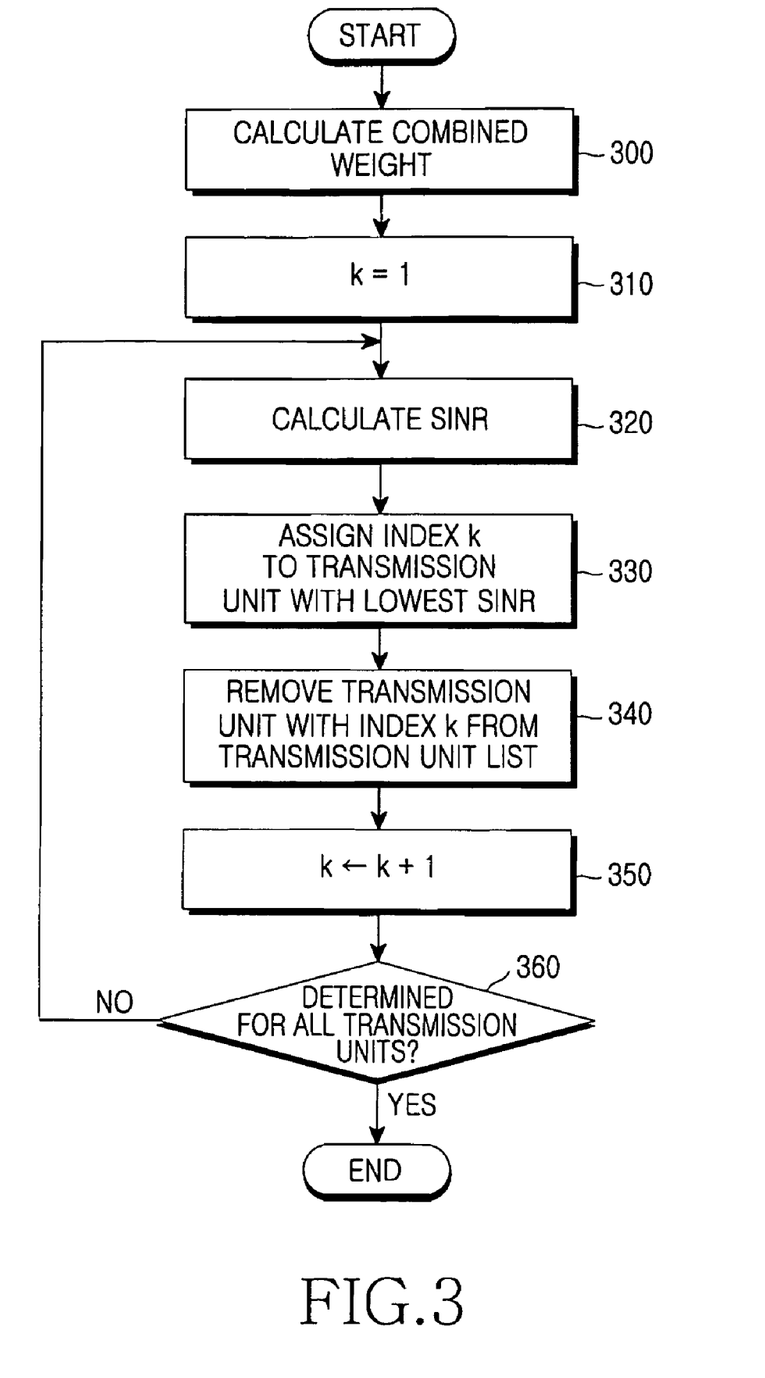
FIG. 3 is a flowchart illustrating a reverse ordering process for successive interference cancellation for received symbols in a second method according to an embodiment of the present invention.

FIG. 3 is a flowchart illustrating a reverse ordering process for successive interference cancellation for received symbols in the second method according to an embodiment of the present invention. With reference to FIG. 3, a description will now be of a reverse ordering process for successive interference cancellation for received symbols in the second method according to an embodiment of the present invention. It will be assumed herein that the reverse ordering process is performed in the channel quality estimator of the receiver.

The channel quality estimator 30 calculates combined weights in step 300. The combined weights can be calculated based on either MMSE or ZF. Herein, a description of the present invention will be made with reference to MMSE combined weights. However, other combined weights can also be used. After determining the combined weights, the channel quality estimator 30 initializes a parameter k to 1 in step 310. Thereafter, in step 320, the channel quality estimator 30 calculates SINRs for the transmission units except for an excluded transmission unit. In an initial process, because where is no excluded transmission unit, the channel quality estimator 30 calculates SINRs for all of the transmission units. In step 330, the channel quality estimator 30 allocates an index k to the transmission unit with the lowest SINR in a transmission unit list. In the initial process, because all of the transmission units are included in the transmission unit list and the parameter k is set to 1, an index 1 is allocated to the transmission unit having the lowest channel quality.

After allocating the index, the channel quality estimator 30 excludes the transmission unit allocated the index k from the transmission unit list in step 340. In the initial process, the transmission unit with the lowest channel quality is excluded from the transmission unit list. This is because the novel algorithm, unlike the conventional algorithm, is designed to demodulate the transmission units in the order of a transmission unit with the lower channel quality. Therefore, in the process of demodulating a transmission unit with a higher channel quality, the demodulated data is not calculated as interference. In step 350, the channel quality estimator 30 increases the index k by one, to arrange the transmission units in the order of a transmission unit with a lower SINR.

After increasing the parameter k, the channel quality estimator 30 determines in step 360 whether the demodulation order has been determined for all of the transmission units. If the demodulation order has been determined for all of the transmission units, the channel quality estimator 30 ends the reverse ordering process. Otherwise, the channel quality estimator 30 returns to step 320 to perform the foregoing process again on the transmission units included in the transmission unit list.

The reverse ordering process first demodulates the transmission units with the lower channel quality so that interferences are canceled in the transmission units demodulated later, thereby increasing the SINR. Because the transmitter uses AMC, the error probability is maintained in a given channel environment. Therefore, even though the transmission units with the lower channel quality are first demodulated, there is no increase in the interference. As a result, compared with the forward ordering method, the reverse ordering method can provide excellent transmission efficiency in the system using AMC.

A description has been made of the reverse ordering process which is the initial process of the proposed second method. Next, a detailed description will be made of the second method proposed to determine an active transmission unit, an MCS, and power allocation.

Figure 4:
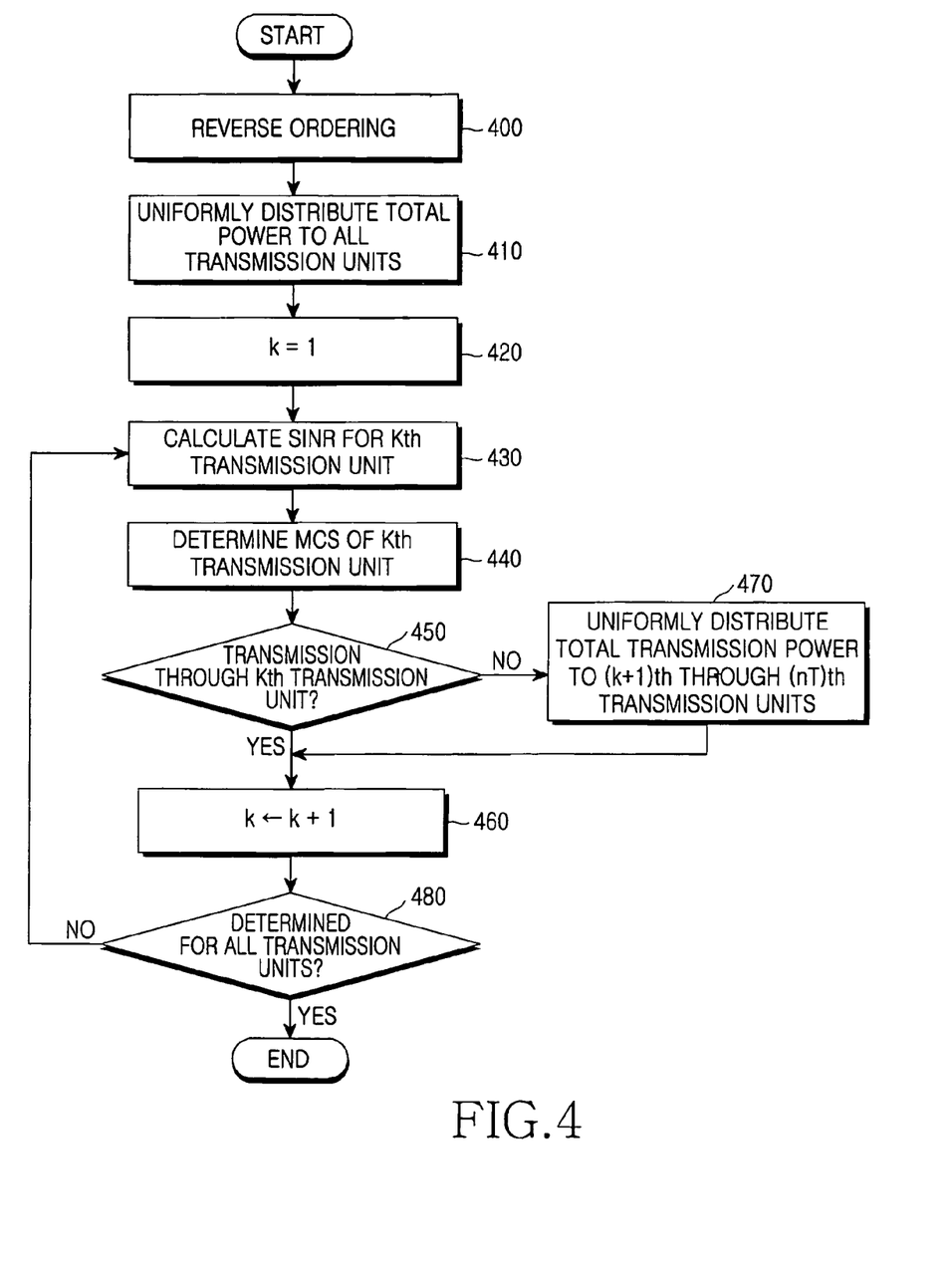
FIG. 4 is a flowchart illustrating a process of determining an active transmission unit, an MCS, and power allocation according to an embodiment of the present invention.

FIG. 4 is a flowchart illustrating a process of determining an active transmission unit, an MCS, and power allocation according to an embodiment of the present invention. With reference to FIG. 4, a detailed description will now be made of a process of determining an active transmission unit, an MCS, and power allocation according to an embodiment of the present invention. It will be assumed herein that the process of FIG. 4 is performed in the controller 20 of the transmitter.

If the demodulation order is completely determined by reverse ordering in the method of FIG. 3 in step 400, the controller 20 uniformly allocates the total transmission power to all of the transmission units in step 410. Uniformly allocating the total transmission power is equivalent to allocating uniform transmission power to $n_T$ transmission units. In step 420, the controller 20 designates a $1^{st}$ transmission unit. Because the transmission units were reverse-ordered in step 400, the $1^{st}$ transmission unit has the lowest channel quality. Therefore, a transmission unit designated in the following step 460 is replaced by a transmission unit having the second lowest channel quality. In step 430, the controller 20 calculates an SINR for the $k^{th}$ transmission unit designated in step 420. Actually, the SINR is different in value according to whether there is a decoding error occurred in the first demodulated data stream. Therefore, the controller 20 can calculate the SINR, assuming that there is no decoding error occurred in the first demodulated stream, and then reflect a loss in the calculated SINR, thereby taking an influence of the decoding error into account.

In step 440, the controller 20 determines an MCS depending on the calculated SINR. Thereafter, the controller 20 determines in step 450 whether there is a need to transmit a data stream through the $k^{th}$ transmission unit. In the process of step 450, the MCS determined in step 440 is used. If there is no need to transmit a data stream through the $k^{th}$ transmission unit, the controller 20 allocates no power to the $k^{th}$ transmission unit and its preceding transmission units, and uniformly allocates power to the following transmission units, i.e., a $(k+1)^{th}$ transmission unit through an $n_T^{th}$ transmission unit, in step 470. However, if there is a need to transmit a data stream through the $k^{th}$ transmission unit, the power allocation process is omitted.

Thereafter, the controller 20 increases the parameter k by one in step 460, and determines in step 480 whether MCSs for all of the transmission units have been determined. If all of the transmission units have been determined, the controller 20 ends the routine. Otherwise, the controller 20 returns to step 430 to repeatedly perform the foregoing process on the transmission unit with the index k increased in step 460.

Figure 5:
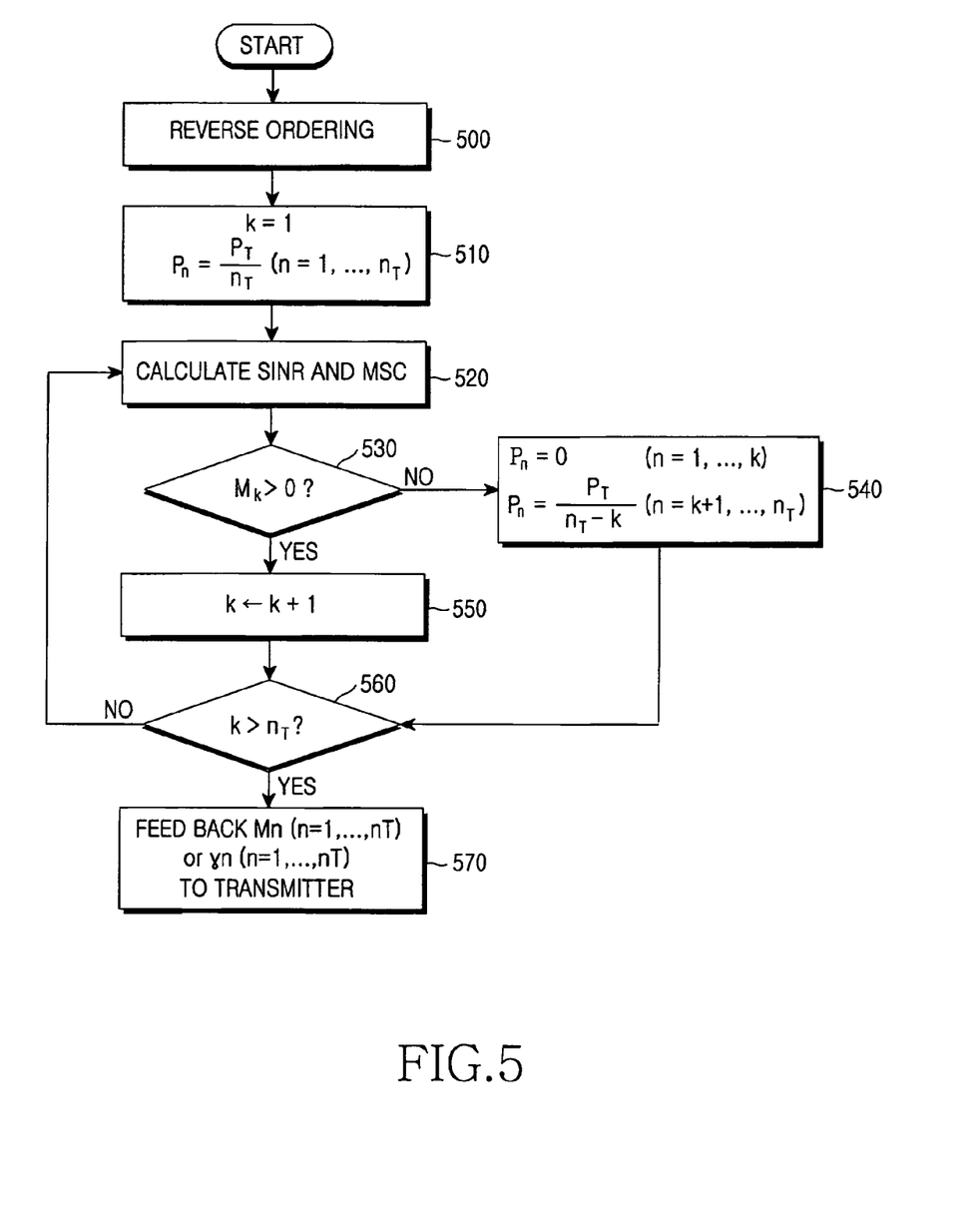
FIG. 5 is a flowchart illustrating an operation of a receiver in a MIMO wireless communication system according to an embodiment of the present invention.

FIG. 5 is a flowchart illustrating an operation of a receiver in a MIMO wireless communication system using the second method according to an embodiment of the present invention. With reference to FIG. 5, a detailed description will now be made of a data stream transmission process performed in a receiver of a wireless communication system. Similarly, the reverse ordering process is first performed in FIG. 5.

The receiver first calculates an estimated fading channel H. In FIG. 5, the receiver determines demodulation order for a data stream received through each antenna using the estimated fading channel H. The demodulation order is determined in step 500 by reverse ordering. Herein, the "reverse ordering" refers to a process of determining demodulation order of pilot symbols in the order of a symbol with the lowest SINR in each step of the serial detection. That is, the reverse ordering successively cancels interference caused by the first-demodulated pilot symbol from the non-demodulated received signal. A reverse-ordered fading channel matrix H is defined as $$\tilde{H}=[\tilde{h}_1 \tilde{h}_2 \ldots \tilde{h}_{n_T}] \quad (2)$$

where $\tilde{h}_n$ denotes a fading channel from an $n^{th}$ transmission unit decided to be demodulated in an $n^{th}$ step by reverse ordering.

After the reverse ordering, the receiver performs initialization in step 510. In the initialization process, the receiver sets k to 1 (k=1) because it must determine MCSs for a plurality of data streams. Thereafter, the receiver initializes a power value to be allocated. That is, the receiver initializes power $P_n$ to $P_T/n_T$ ($P_n=P_T/n_T$) in the power initialization process. Therefore, if the total available transmission power is defined as $P_T$, the initial power $P_n$ allocated to all of the $n_T$ transmission units is determined by $P_T/n_T$.

After the initialization, the receiver calculates a $k^{th}$ SINR $\gamma_k$ in the demodulation order determined by reverse ordering, and determines an MCS $M_k$ based on the $\gamma_k$, in step 520.

More specifically, if an MCS indicating a combination of a modulation scheme and a coding rate of a channel encoder for a data symbol to be demodulated in a $k^{th}$ step is represented by $M_k$, the $M_k$ is determined depending on the $\gamma_k$ denoting an SINR of a pilot symbol demodulated in the $k^{th}$ step. Therefore, the $\gamma_k$ is calculated by $$\gamma_k = P_k \tilde{h}_k^H (\tilde{H}_k P_k \tilde{H}_k^H + I_{n_R})^{-1} \tilde{h}_k \quad (3)$$

In Equation (3), $\tilde{h}_k$ is a $k^{th}$ column vector of a matrix $\tilde{H}$ and denotes a channel vector given by a transmission unit that will transmit a data symbol demodulated in a $k^{th}$ step. Further, $I_{n_R}$ denotes an $n_R^{th} n_R \times n_R$ identity matrix. The receiver defines a channel matrix $\tilde{H}_k=[\tilde{h}_{k+1} \tilde{h}_{k+2} \ldots \tilde{h}_{n_T}]$ given by transmission units demodulated after the $k^{th}$ step, in order to determine a symbol to be demodulated after determining each demodulation signal. Further, in Equation (3), $P_k$ denotes power allocated to a transmission unit demodulated in the $k^{th}$ step, and a power matrix $P_k$ allocated to the transmission units demodulated after the $k^{th}$ step is defined as $$P_k = \begin{bmatrix} P_{k+1} & 0 & \ldots & 0 \\ 0 & P_{k+1} & \ldots & 0 \\ 0 & 0 & \ddots & 0 \\ 0 & 0 & \ldots & P_{n_T} \end{bmatrix} \quad (4)$$

For k=1 in Equation (4), the receiver determines an MCS in a first step, in step 520. That is, in step 520, the receiver allocates initial power to a transmission unit with the lowest SINR. In other words, the receiver allocates initial power to calculate the lowest SINR $\gamma_1$. As described above, the receiver allocates uniform initial power to all of the transmission units. Therefore, the allocated initial power is determined by $P_i=P_T/n_T$, where i=1, ..., $n_T$. As a result, the receiver calculates an SINR $\gamma_1$ in the first step in accordance with Equation (3), and determines an MCS $M_1$ having the highest data rate while satisfying a bit error rate (BER) or a frame error rate (FER) at the SINR $\gamma_1$. The receiver determines an MCS based on an SINR according to an error correction coding technique used in the mobile communication system.

After determining the $M_k$, the receiver determines in step 530 whether the calculated $M_k$ is greater than 0. In the initial step, the receiver determines if the $M_1$ is greater than 0. The $M_1>0$ means that there is data transmission. That is, it means that there is a need to transmit data streams even with the transmission unit with the lowest channel quality. However, $M_1 \leq 0$ means that there is no data transmission. That is, the data can be transmitted only for $M_k>0$. If it is determined in step 530 that the $M_1$ is greater than 0, i.e., there is data transmission, the receiver increases k by 1 in step 550, maintaining the initial allocation value. That is, for k=2, power is allocated in the power allocation method used in the first step. In this case, the allocated power is determined by $P_k=P_T/n_T$, where k=2, . . . , $n_T$. Thereafter, the receiver calculates an SINR $\gamma_2$ in a second step, and determines an MCS $M_2$ corresponding to the $\gamma_2$.

However, if it is determined in step 530 that $M_1$=0, i.e., there is no data transmission in the first step, the receiver withdraws, in step 540, the power allocated to the transmission unit to be demodulated in the first step, and uniformly distributes the total transmission power to the remaining ($n_T$-1) transmission units, and then proceeds to step 550. For example, for $M_1$=0, because the transmission unit to be demodulated in the first step cannot transmit data, the transmission power $P_k$ (e.g., $P_k=P_T/n_T-1$), where k=2, . . . , $n_T$, determined by dividing the total transmission power by the number of the remaining transmission units is uniformly allocated to each of the transmission units. Because the power allocation is performed secondly, the receiver calculates an SINR $\gamma_2$, and determines an MCS $M_2$ corresponding thereto.

An increase in the step reverse-ordered in step 500 causes a simple increase in SINR for the transmission units demodulated in each step. Therefore, the receiver successively determines MCSs in the order of the transmission unit with the lower SINR. If MCSs determined in the first step through a $(k-1)^{th}$ step are all 0, and an MCS determined in a $k^{th}$ step first becomes a non-zero value, then MCSs in the next steps are always greater than 0. Therefore, the number of transmission units selected to be used for transmission according to the novel method from now on becomes $n_T-(k-1)$, and power allocated to the selected transmission units is fixed to $P_T/(n_T-k+1)$ and is maintained even in the next step.

If the MCSs determined in the first step through the $(k-1)^{th}$ step are all 0, and an MCS determined in the $k^{th}$ step is also 0, the receiver assumes the number of transmission units selected to be used for transmission in up to the current $k^{th}$ step, to be $n_T$-k. Further, the receiver assumes power allocated to the transmission units in the next steps to be $P_T/(n_T-k)$, and then goes to the $(k+1)^{th}$ step. The foregoing process is performed in step 540.

Steps 520 through 550 are repeated $n_T$ times, i.e., repeated as many times as the number $n_T$ of the transmission units. The receiver determines in step 560 whether the number of the repetitions has reached the $n_T$. If the number of the repetitions has reached the $n_T$, the receiver proceeds to step 570. However, if the number of the repetitions has not reached the $n_T$, the receiver repeats the process of steps 520 through 560.

The MCSs $M_k$ (k=1, . . . , $n_T$) of each layer, determined for the transmission units, are feedback values to each transmitter. In step 570, the receiver transmits the determined values to the transmitter through a predetermined feedback channel. The transmitter then demultiplexes a main data stream into as many sub-data streams as the number of transmission units with $M_k>0$ at the demultiplexer 21 using the MCS feedback information for each transmission unit. For the demultiplexed sub-data streams, the AMC blocks 22, 23 and 24 determine modulation schemes and coding rates according to the MCS information for the transmission units, respectively, and encode and modulate the transmission data using the determined coding rates and modulation schemes. That is, the encoded and modulated sub-data streams are transmitted through their corresponding transmission units.

The second method proposed in the present invention includes determining active transmission units (transmission units allocated transmission-allowed power, i.e., transmission units with $M_k>0$), determining an MCS for the data transmitted from each of the active transmission units, and determining power allocated to each of the active transmission units. The three processes do not require repeated calculations, preventing an increase in the calculation. Assuming that the number of transmission units is four, an optimal scheme of determining active transmission units with the highest data rate and an MCS for each of the active transmission units taking into account all of the possible combinations for which the demodulation order is considered, requires 64 V-BLAST operations. However, the second method proposed in the present invention requires a total of 2 V-BLAST operations: one operation for the reverse ordering process and another operation for the MCS decision process. The proposed method requires a total of 2 V-BLAST operations even though the number of transmission units exceeds 4. Therefore, the calculations required by the proposed method are insignificant, compared with the calculations required by the optimal scheme in which the increase in number of transmission units exponentially increases the V-BLAST operations.

Figure 6:
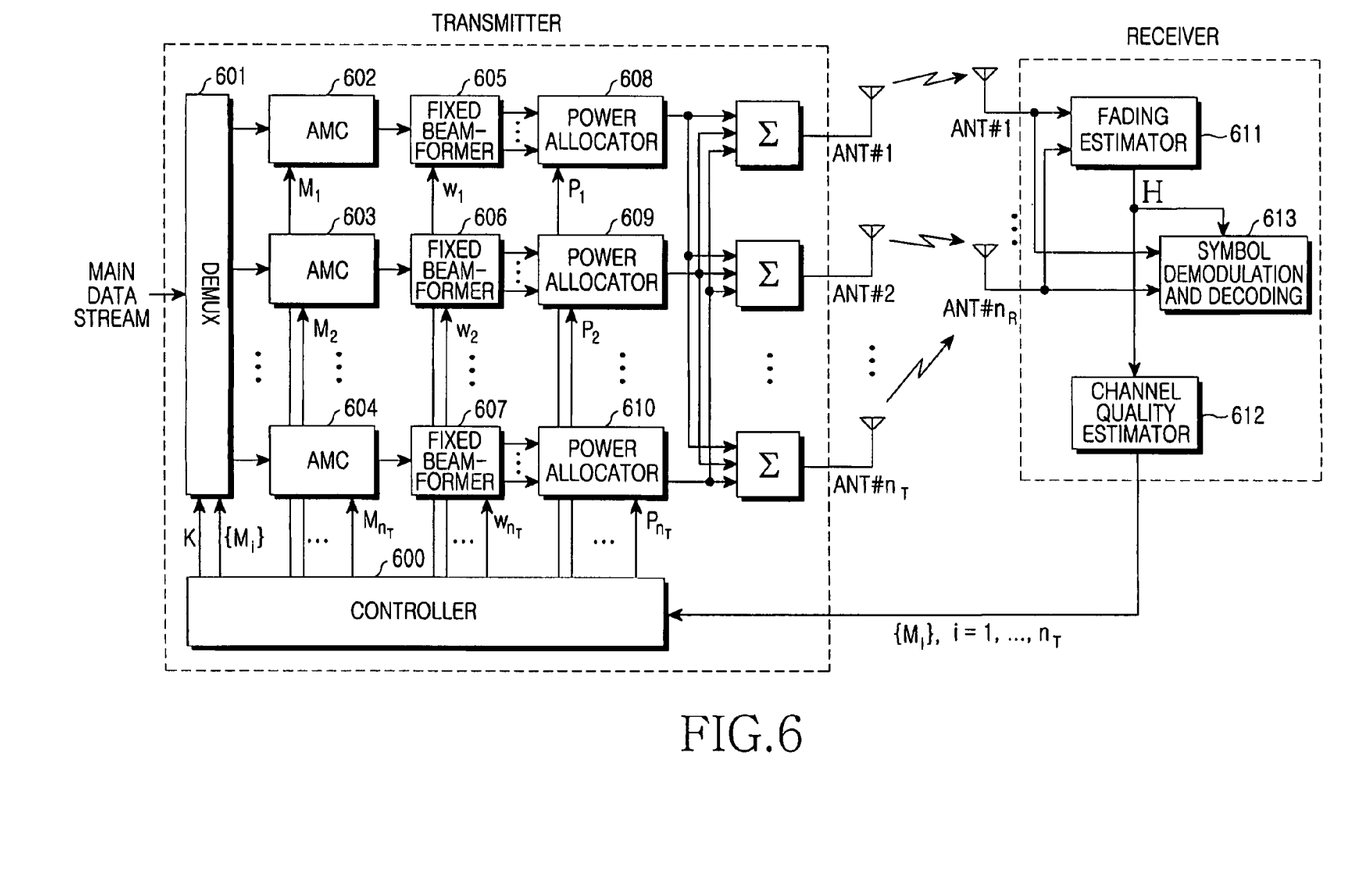
FIG. 6 is a block diagram illustrating a structure of a transceiver for a PCBRC system to which the present invention is applied.

FIG. 6 is a block diagram illustrating a structure of a transceiver for a PCBRC system to which the present invention is applied. A comparison between FIG. 6 and FIG. 1 will be made herein below.

Referring to FIG. 6, a receiver is equal to the receiver of FIG. 1. However, a transmitter includes fixed beamformers 605, 606 and 607 intervening between AMC blocks 602, 603 and 604 for transmitting data streams, and power allocators 608, 609 and 610. Because the transmission signals are transmitted through the fixed beamformers 605, 606 and 607 after being beamformed, the fixed beams rather than the antennas serve as the transmission units. The technique proposed in the present invention is implemented in the channel status estimator 612 when the MCS information is fed back, and implemented in the controller 600 when the CQI is fed back.

Figure 7:
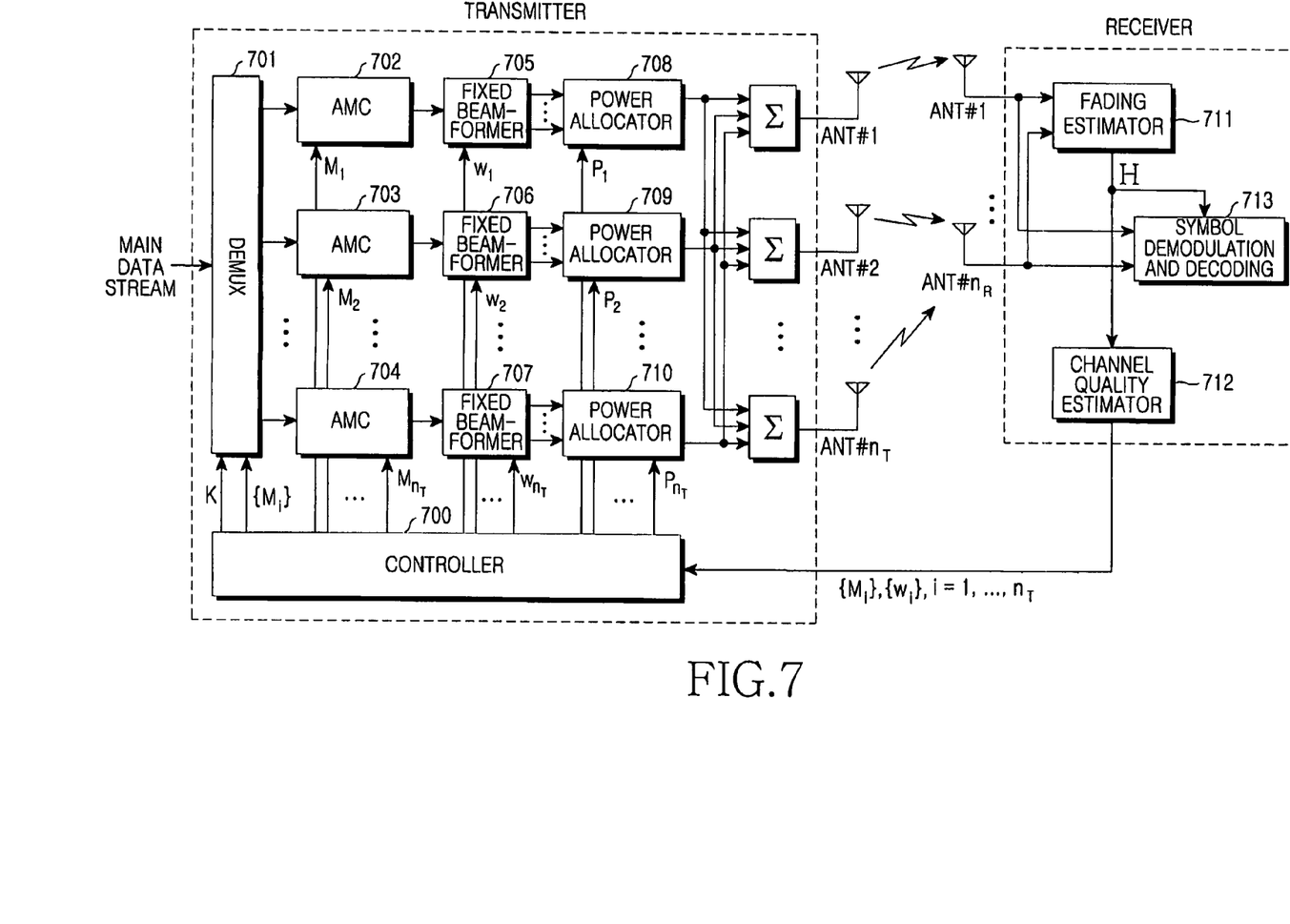
FIG. 7 is a block diagram illustrating a structure of a transceiver for a PSRC system to which the present invention is applied.

FIG. 7 is a block diagram illustrating a structure of a transceiver for a PSRC system to which the present invention is applied. A comparison between FIG. 7 and FIG. 1 will be made herein below.

Referring to FIG. 7, a receiver is equal to the receiver of FIG. 1. However, a transmitter includes adaptive beamformers 705, 706 and 707 intervening between AMC blocks 702, 703 and 704 for transmitting data streams, and power allocators 708, 709 and 710. Because the transmission signals are transmitted through the adaptive beamformers 705, 706 and 707 after being beamformed, the adaptive beams rather than the antennas serve as the transmission units. In the PSRC system, for adaptive beamforming, the receiver additionally feeds back beamforming weights to the transmitter. The technique proposed in the present invention is implemented in the channel status estimator 712 when the MCS information is fed back, and implemented in the controller 700 when the CQI is fed back.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining a transmission unit for data stream transmission in a wireless communication system in which multiple transmission and reception antennas are used and a receiver provides information on a data stream to be transmitted through a transmission unit, the method comprising the steps of:

reverse-ordering combined weights for multiple transmission units based on fading values from the multiple transmission antennas to the multiple reception antennas;

successively selecting transmission units for data stream transmission among the reverse-ordered transmission units;

calculating a signal-to-interference plus noise ratio ("SINR") for each of the selected transmission units for the data stream transmission and feeding back the SINR to a transmitter; and determining a modulation and coding scheme (MCS) for each of the selected transmission units and feeding back the MCS to the transmitter, wherein the method successively demodulates individual transmission data of the multiple transmission units in an order of transmission units with lower channel quality based on the SINR, wherein a low SINR is indicative of lower channel quality.

2. The method of claim 1, further comprising the step of uniformly distributing the total transmission power to the selected transmission units for data stream transmission before determining the MCS.

3. The method of claim 1, wherein the step of selecting transmission units for data stream transmission comprises the step of excluding a transmission unit with no transmission gain, if any.

4. The method of claim 1, wherein each of the fading values is acquired by calculating a combined weight using a minimum mean squared error (MMSE) algorithm.

5. The method of claim 1, wherein each of the fading values is acquired by calculating a combined weight using a zero forcing (ZF) algorithm.

6. The method of claim 1, wherein the transmission units for data stream transmission are transmission antennas.

7. The method of claim 1, wherein the transmission units for data stream transmission are transmission streams.

8. The method of claim 1, wherein the transmission units for data stream transmission are common bases.

9. A method for determining a transmission unit for data stream transmission in a wireless communication system in which multiple transmission and reception antennas are used and a receiver provides information on a data stream to be transmitted through a transmission unit, the method comprising the steps of:

reverse-ordering combined weights for multiple transmission units based on fading values from the multiple transmission antennas to the multiple reception antennas;

successively selecting transmission units for data stream transmission among the reverse-ordered transmission units; and calculating a signal-to-interference plus noise ratio ("SINR") for each of the selected transmission units for the data stream transmission and feeding back the SINR to a transmitter, wherein the method successively demodulates individual transmission data of the multiple transmission units in an order of transmission units with lower channel quality based on the SINR, wherein a low SINR is indicative of lower channel quality.

10. The apparatus of claim 9, wherein the step of selecting transmission units for data stream transmission comprises the step of excluding a transmission unit with no transmission gain, if any.

11. The apparatus of claim 9, wherein each of the fading values is acquired by calculating a combined weight using a minimum mean squared error (MMSE) algorithm.

12. The apparatus of claim 9, wherein each of the fading values is acquired by calculating a combined weight using a zero forcing (ZF) algorithm.

13. The apparatus of claim 9, wherein the transmission units for data stream transmission are transmission antennas.

14. The apparatus of claim 9, wherein the transmission units for data stream transmission are transmission streams.

15. The apparatus of claim 9, wherein the transmission units for data stream transmission are common bases.

16. An apparatus for determining a transmission unit for data stream transmission in a wireless communication system in which multiple transmission and reception antennas are used and a receiver provides information on a data stream to be transmitted through a transmission unit, the apparatus comprising:

a fading estimator for calculating fading values from the multiple transmission antennas to the multiple reception antennas; and a channel quality estimator for reverse-ordering combined weights for multiple transmission units based on the fading values from the multiple transmission antennas to the multiple reception antennas, successively selecting transmission units for data stream transmission among the reverse-ordered transmission units, determining a modulation and coding scheme (MCS) for each of the selected transmission units, and feeding back the MCS to a transmitter, wherein the channel quality estimator calculates a signal-to-interference plus noise ratio ("SINR") for each of the selected transmission units for the data stream transmission and further feeds back the SINR to the transmitter, wherein the channel quality estimator successively demodulates individual transmission data of the multiple transmission units in the order of transmission units with lower channel quality, based on the SINR, wherein a low SINR is indicative of lower channel quality.

17. The apparatus of claim 16, wherein the channel quality estimator uniformly distributes the total transmission power to the selected transmission units for data stream transmission before determining the MCS.

18. The apparatus of claim 16, wherein the channel quality estimator excludes a transmission unit with no transmission gain, if any, while selecting the transmission units for data stream transmission.

19. The apparatus of claim 16, wherein each of the fading values is acquired by calculating a combined weight using a minimum mean squared error (MMSE) algorithm.

20. The apparatus of claim 16, wherein each of the fading values is acquired by calculating a combined weight using a zero forcing (ZF) algorithm.

21. The apparatus of claim 16, wherein the transmission units for data stream transmission are transmission antennas.

22. The apparatus of claim 16, wherein the transmission units for data stream transmission are transmission streams.

23. The apparatus of claim 16, wherein the transmission units for data stream transmission are common bases.

24. The apparatus of claim 16, further comprising a symbol demodulation and decoding block for demodulating and decoding symbols per reception unit based on the fading value.

25. An apparatus for determining a transmission unit for data stream transmission in a wireless communication system in which multiple transmission and reception antennas are used and a receiver provides information on a data stream to be transmitted through a transmission unit, the apparatus comprising:
- a fading estimator for calculating fading values from the multiple transmission antennas to the multiple reception antennas; and
- a channel quality estimator for reverse-ordering combined weights for multiple transmission units based on the fading values from the multiple transmission antennas to the multiple reception antennas, successively selecting transmission units for data stream transmission among the reverse-ordered transmission units, calculating a signal-to-interference plus noise ratio ("SINR") for each of the selected transmission units for data stream transmission, and feeding back the SINR to a transmitter,
- wherein the channel quality estimator successively demodulates individual transmission data of the multiple transmission units in the order of transmission units with lower channel quality based on the SINR, wherein a low SINR is indicative of lower channel quality.

26. The apparatus of claim 25, wherein the channel quality estimator excludes a transmission unit with no transmission gain, if any, while selecting the transmission units for data stream transmission.

27. The apparatus of claim 25, wherein each of the fading values is acquired by calculating a combined weight using a minimum mean squared error (MMSE) algorithm.

28. The apparatus of claim 25, wherein each of the fading values is acquired by calculating a combined weight using a zero forcing (ZF) algorithm.

29. The apparatus of claim 25, wherein the transmission units for data stream transmission are transmission antennas.

30. The apparatus of claim 25, wherein the transmission units for data stream transmission are transmission streams.

31. The apparatus of claim 25, wherein the transmission units for data stream transmission are common bases.

32. The apparatus of claim 25, further comprising a symbol demodulation and decoding block for demodulating and decoding symbols per reception unit based on the fading value.

* * * * *